US008639799B2

(12) United States Patent
Hansen et al.

(10) Patent No.: US 8,639,799 B2
(45) Date of Patent: Jan. 28, 2014

(54) NETWORK SUPERVISION WITH CONTROL SYSTEMS

(75) Inventors: Kai Hansen, Oslo (NO); Marius-Petru Stanica, Ploiesti (RO); Esther Gelle, Remetschwil (CH)

(73) Assignee: ABB Research Ltd. (CH)

( * ) Notice: Subject to any disclaimer, the term of this patent is extended or adjusted under 35 U.S.C. 154(b) by 471 days.

(21) Appl. No.: 12/505,768

(22) Filed: Jul. 20, 2009

(65) Prior Publication Data

US 2010/0016994 A1 Jan. 21, 2010

Related U.S. Application Data

(63) Continuation of application No. PCT/EP2008/050518, filed on Jan. 17, 2008.

(30) Foreign Application Priority Data

Jan. 19, 2007 (SE) ...................................... 0700135

(51) Int. Cl.
*G06F 15/173* (2006.01)

(52) U.S. Cl.
USPC .......................................... 709/224; 709/223

(58) Field of Classification Search
USPC ........................... 709/223, 224; 700/9, 80, 83
See application file for complete search history.

(56) References Cited

U.S. PATENT DOCUMENTS 6,728,262 B1 * 4/2004 Woram .......................... 370/466
2002/0007422 A1 * 1/2002 Bennett .......................... 709/246

2002/0116486 A1 8/2002 Toure et al.
2003/0014500 A1 1/2003 Schleiss et al.
2005/0028024 A1 2/2005 Kataoka et al.
2005/0190054 A1 9/2005 Scott et al.

FOREIGN PATENT DOCUMENTS

WO 9744937 A2 11/1997
WO 0076228 A1 12/2000
WO 0150099 A1 7/2001

OTHER PUBLICATIONS

International Preliminary Report on Patentability; PCT/EP2008/050518; Feb. 20, 2009; 13 pages.
International Search Report and Written Opinion of the International Searching Authority; PCT/EP2008/050518; May 6, 2009; 11 pages.

(Continued)

*Primary Examiner* — Quang N Nguyen
(74) *Attorney, Agent, or Firm* — St. Onge Steward Johnston & Reens LLC

(57) ABSTRACT

Supervision of industrial plants can be improved by comparison and analysis of process information and network information. The comparison may be used to provide alarms and operator information for network-related or process device failures. The information may also be used to identify a cause of a failure. A method is described for supervising an industrial control system, including a plant network for supervision, a client/server network for server connection with workstations, and a control network connected to industrial controllers. The method comprises the steps of gathering process information, and gathering network information, and by comparing information provided by data communications network monitoring with process control information and using the result of the comparison to assist in determining a cause of a problem or possible problem in a process controlled of the industrial control system.

25 Claims, 5 Drawing Sheets

(56) References Cited

OTHER PUBLICATIONS

Gelle, E. et al.; "IT Asset Management of Industrial Automation Systems" In: Engineering of Computer-Based Systems, 2005. ECBS '05. 12th IEEE International Conference and Workshops on the Greenbel, MD, USA Apr. 4-7, 2005, Piscataway, NJ, USA, IEEE, p. 123-128.

Swedish Office Action (no translation available); 0700135-7; Jul. 18, 2007; 4 pages.

International-Type Search Report; ITS/SE07/00026; Jul. 18, 2007; 10 pages.

* cited by examiner

NETWORK SUPERVISION WITH CONTROL SYSTEMS

CROSS-REFERENCE TO RELATED APPLICATIONS

The present application is a continuation of pending International patent application PCT/EP2008/050518 filed on Jan. 17, 2008 which designates the United States and claims priority from Swedish patent application 07000135-7 filed on Jan. 19, 2007, the content of which is incorporated herein by reference.

FIELD OF THE INVENTION

The present invention concerns methods for monitoring and control of network information in an industrial plant. It comprises one or more techniques to facilitate commissioning and operation of a plant, and uses both network generated information and process information.

BACKGROUND OF THE INVENTION

Industrial control systems are for instance applied in manufacturing and process industries, such as chemical plants, oil production or processing plants, refineries, pulp and paper mills, steel mills and automated factories. Industrial control systems are also widely used within the electrical power industry. Such industrial control systems have a large amount of network infrastructure, of which a major proportion can be based on Ethernet and TCP/IP technology. With such large data and control infrastructures there is an important requirement for an efficient supervision of the plant behaviour, and also for efficient supervision of the network infrastructure.

SUMMARY OF THE INVENTION

The object of the present invention is to provide an industrial controller with a method and a means to combine process-related information with data communication network-related information from data network monitoring and/or supervision. This may be used for plant development both at commissioning and operational time. The improvement may also provide cause identification of failed process devices. An embodiment of the present invention provides an improvement to methods of network management for an industrial plant, both at commissioning and at operational times.

According to an aspect of the invention a method is described for supervising an industrial control system, comprising a plant network for supervision, a client/server network for server connection with workstations, a control network connected to industrial controllers, said method comprising the steps of gathering process information, and gathering network information, and further by comparing information provided by data communications network monitoring with process control information and using the result of the comparison to assist in determining a cause of a problem or possible problem in a process controlled of the said industrial control system.

According to an embodiment of the present invention a method is described for supervising an industrial control system, comprising a plant network for supervision, a client/server network for server connection with workstations, a control network connected to industrial controllers, said method comprising the steps of gathering process information, and gathering network information, and further by comparing information to determine a cause of a fault or possible fault wherein the information is gathered in real-time.

According to another embodiment of the present invention a method is described for supervising an industrial control system, comprising a plant network for supervision, a client/server network for server connection with workstations, a control network connected to industrial controllers, said method comprising the steps of gathering process information, and gathering network information, and further by comparing information to determine a cause of a fault or possible fault wherein the process or process control information is gathered by means of a data server compatible with a standard for object linking or information exchange between distributed, mixed or un-homogenous systems.

According to another embodiment of the present invention a method is described for supervising an industrial control system, comprising a plant network for supervision, a client/server network for server connection with workstations, a control network connected to industrial controllers, said method comprising the steps of gathering process information, and gathering network information, and further by comparing information to determine a cause of a fault or possible fault wherein the process or process control information is gathered by means of a data server compatible with OPC.

According to another embodiment of the present invention a method is described for supervising an industrial control system, comprising a plant network for supervision, a client/server network for server connection with workstations, a control network connected to industrial controllers, said method comprising the steps of gathering process information, and gathering network information, and further by comparing information to determine a cause of a fault or possible fault wherein the data communications network monitoring information is gathered by means of a device and/or application compatible with SNMP (Simple Network Management Protocol).

According to another embodiment of the present invention a method is described for supervising an industrial control system, comprising a plant network for supervision, a client/server network for server connection with workstations, a control network connected to industrial controllers, said method comprising the steps of gathering process information, and gathering network information, and further by comparing information provided by data communications network monitoring with process control information and using the result of the comparison to assist in determining a cause of a problem or possible problem in a process controlled by a process controller in the said industrial control system, and by comparing the combined information gathered according to SNMP and OPC in order to assist in determining the cause of the fault or the possible fault.

According to another embodiment of the present invention a method is described for supervising an industrial control system, wherein process information is compared to network information and recording an information, and/or an event, and/or an alarm in the said industrial control system when the said process information indicates a problem, but the said network monitoring information does not indicate a problem.

According to another embodiment of the present invention a method is described for supervising an industrial control system, wherein process information is compared to network information and by checking, on receipt of a faulty status for a process device that the process logic is as expected, and checking on receiving confirmation that the process logic is as expected all network devices the process device is connected to, and by generating an alarm for the process logic of the process device or the process device if all the network devices show a normal status; or else by generating an alarm if some of the network devices show a faulty status for the faulty network devices.

According to another embodiment of the present invention a method is described for supervising an industrial control system, wherein process information is compared to network information and by identifying one or more persons responsible for the controlled process and by sending information based on a copy of the recorded information to one or more of them.

According to another aspect of the present invention, an industrial control system is described comprising a plant network for supervision, a client/server network for server connection with workstations, a control network connected to industrial controllers, said system comprising means for gathering process information, and gathering network information, wherein the system further comprises network isolation means for segregating the networks and one or more applications means for comparing information provided by data communications network monitoring with process control information and using the result of the comparison to assist in determining a cause of a problem or possible problem in a process controlled of the said industrial control system.

According to another aspect of the present invention, an industrial control system is described comprising a plant network for supervision, a client/server network for server connection with workstations, a control network connected to industrial controllers, said system comprising means for gathering process information, and gathering network information, wherein the system further comprises at least one data server means compatible with OPC.

According to another aspect of the present invention, an industrial control system is described comprising a plant network for supervision, a client/server network for server connection with workstations, a control network connected to industrial controllers, said system comprising means for gathering process information, and gathering network information, wherein the system further comprises means for gathering data communications network monitoring information comprising a device, application or agent compatible with SNMP (Simple Network Management Protocol).

According to another aspect of the present invention, an industrial control system is described comprising a plant network for supervision, a client/server network for server connection with workstations, a control network connected to industrial controllers, said system comprising means for gathering process information, and gathering network information, wherein the system further comprises means for comparing the combined information gathered according to SNMP and OPC.

A principal advantage of the present invention is that information from the industrial process or equipment may be combined with information from the data communication networks and provide improved diagnostic capabilities in industrial plants and processes. Another advantage is that the functionality offered by the existing network management tools is extended by the present invention so filling an existing gap in condition detection and reporting. This provides improved information and facilitate will help both plant operation both at commissioning and operational time by facilitating detection of failed or failing process devices. The additional scope provides information to perform the cause identification of some failed or failing process devices. This improvement is also of benefit during plant development or upgrades, again both during commissioning and during subsequent normal operation.

Additional advantages include that the diagnostic functionality for existing industrial controller devices and other networked process devices is improved, without additional hardware or configuration changes. The methods involved may also be implemented in a user friendly way.

In a preferred embodiment of the methods of the invention one or more methods may be carried out by a computing device comprising one or more microprocessor units or computers. The control unit(s) comprises memory means such for storing one or more computer programs for carrying out the improved methods. Preferably such computer program contains instructions for the processor to perform the method as mentioned above and described in more detail below.

BRIEF DESCRIPTION OF THE DRAWINGS

The present invention will be described in more detail in connection with the enclosed schematic drawings wherein.

DETAILED DESCRIPTION OF THE INVENTION

Figure 4:
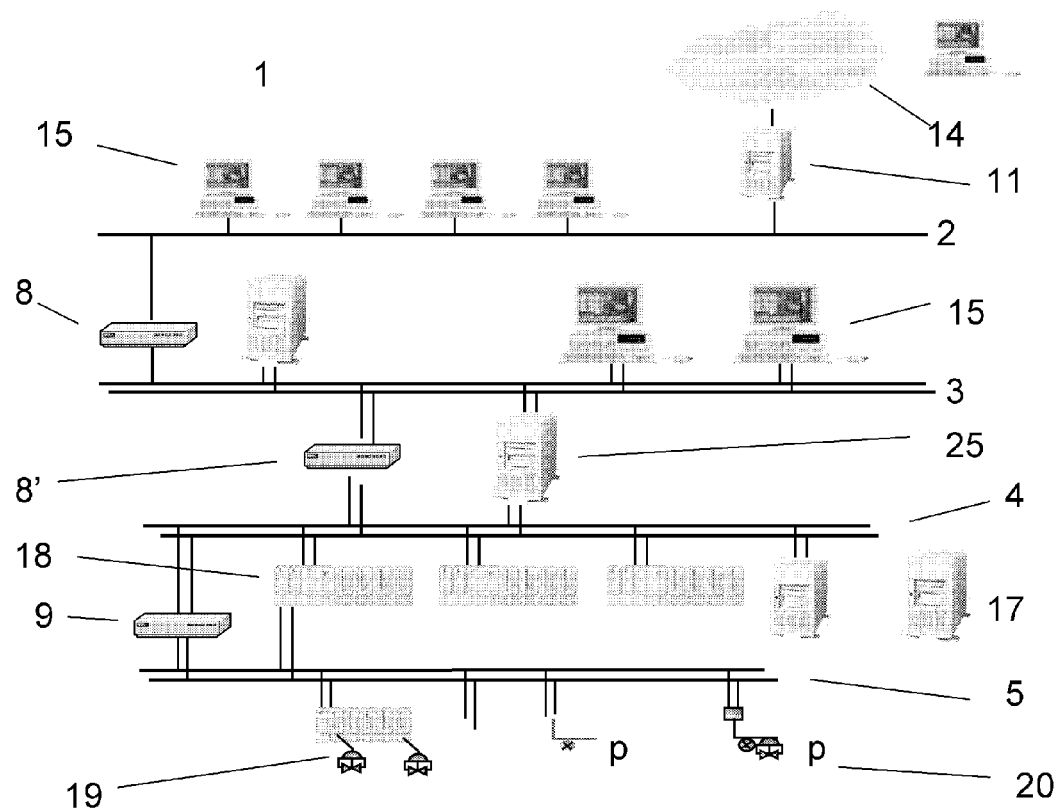
FIG. 4 shows a schematic overview of the network and relevant equipment to be used in the industrial plant.

FIG. 4 shows a simplified and general view over an industrial plant control system network 1, containing a plant network 2 for supervision with workstations 15, a client/server network 3 for server connection with workstations 15, a control network 4 for connection to industrial controllers 18 and a field network 5 for the connection of re-mote I/O devices 19 and or proxy devices 20. Network isolation devices 8, 8' are used to segregate the networks. The plant network 2 may be connected via a suitable firewall 11 to a public network such as the Internet 14.

Figure 1:
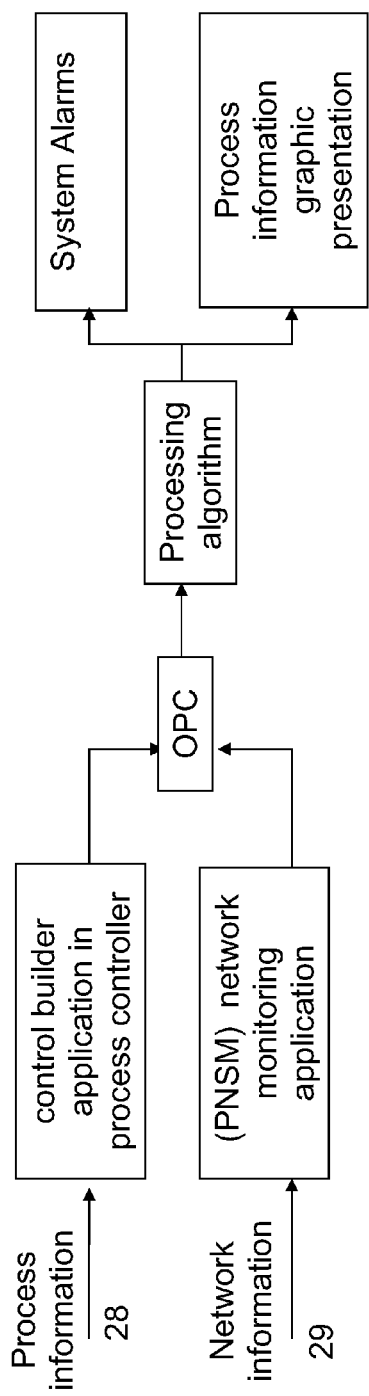
FIG. 1 shows a detailed view of the combination among process and network information.

FIG. 1 shows an industrial plant network as a block diagram. The plant network may be considered as a mixed or unhomogenous network in that it may include two or more networks or sub-networks connected together and running with a different protocol or a different set of protocols. The plant network of FIG. 1 for example contains a client-server network 3 and a control network 4, separated by a network isolation device, a SNMP enabled switch or industrial router 9, an industrial controller 20 and an Ethernet enabled remote I/O device 22. In one development remote I/O device 22 may optionally be an Ethernet enabled device arranged with an equivalent of a Ethernet link or network for high speed transmission of up to 100 Mbits/or more, complying with IEEE standards such as IEEE 802 or later. SNMP network information can be gathered from the industrial controller supervision station 15 on 2, from the switch 9 and from the network isolation device 8. Process information is gathered from the industrial controller 20 and from the device. Preferably the industrial controller is an advanced industrial controller such as of the AC800M type or later, supplied by ABB.

FIG. 1 shows schematically tools within a supervision and communication system of an industrial plant an industrial controller used either for handling or processing process information 28, or used for handling or processing network information 29, according to an embodiment of the invention. Process information 28 is used within a process control software developers package such as ControlBuilder. Network information is consumed within a network monitoring application such as a PNSM (PC, Network and Software monitoring) tool. Both tools may communicate with the alarms system and with the information display system by means of OPC (OLE for Process Control) and by means of the underlying process control system software architecture.

Figure 2:
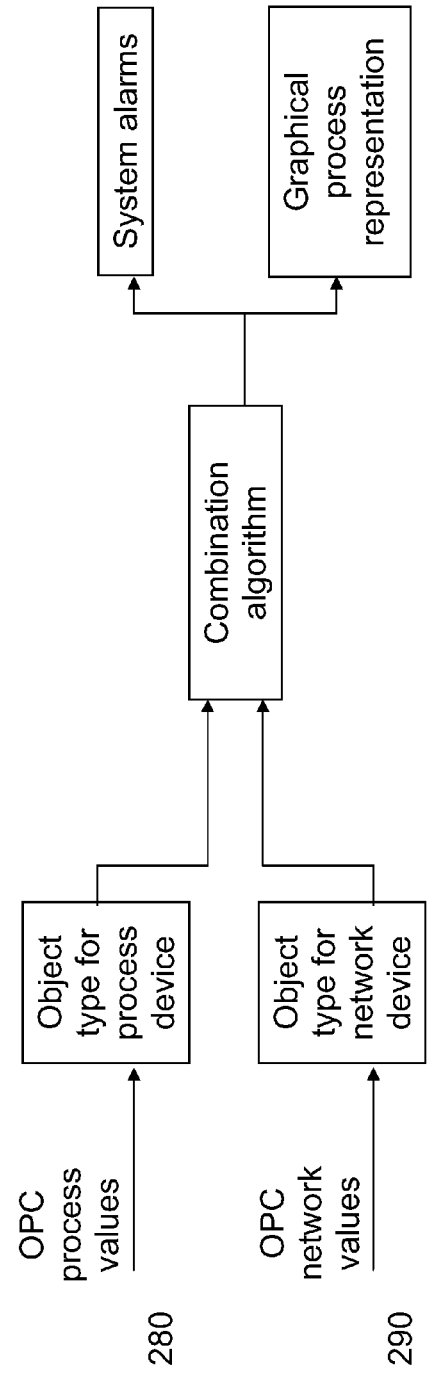
FIG. 2 shows a view about how the process and network information are being combined and where the results are displayed on a supervision station for an industrial plant.
Figure 3:
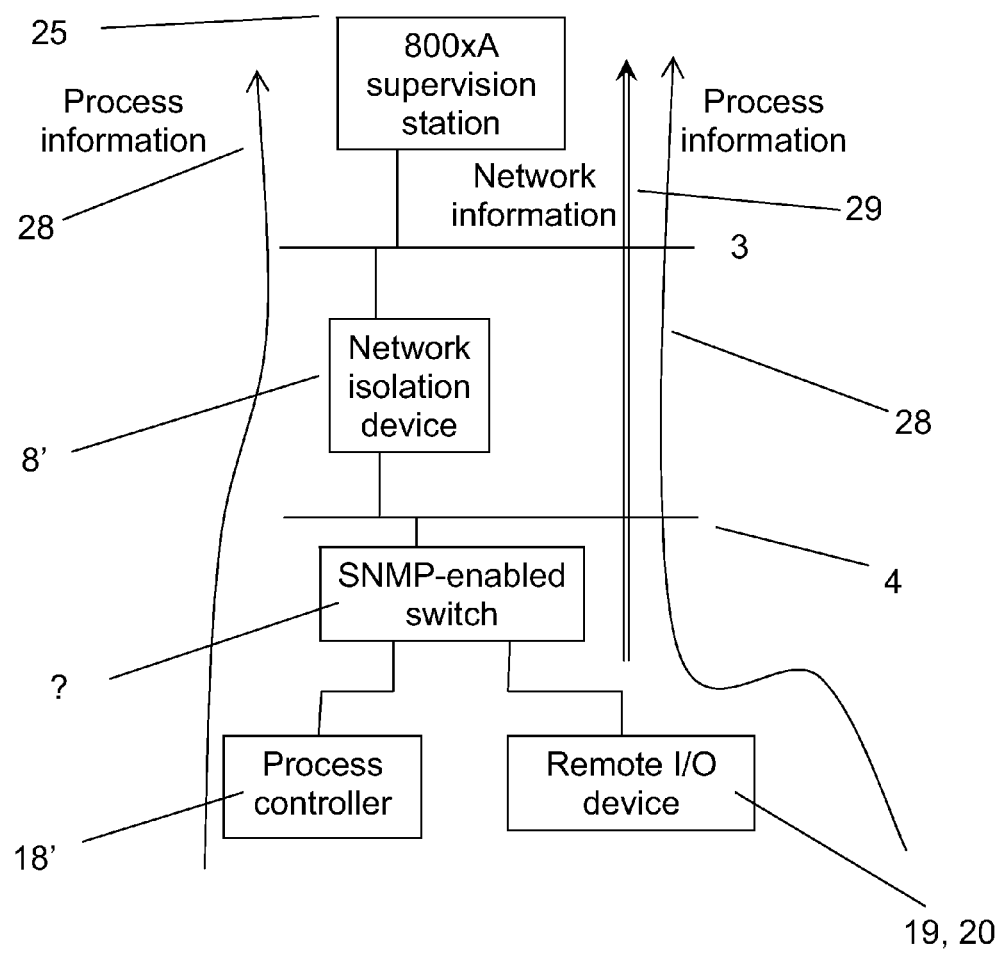
FIG. 3 shows a simplified example of network devices interconnection and the propagation of process and network information to a supervision station from an industrial controller.

FIG. 2 shows a general view over a schematic format or layout for the proposed algorithm of comparison of network information 290 with process information 280, taking into account the object type representations for process devices and for network devices. It is to be mentioned that in the object type for a process device, a list of all its interconnections to network devices is given.

Figure 5:
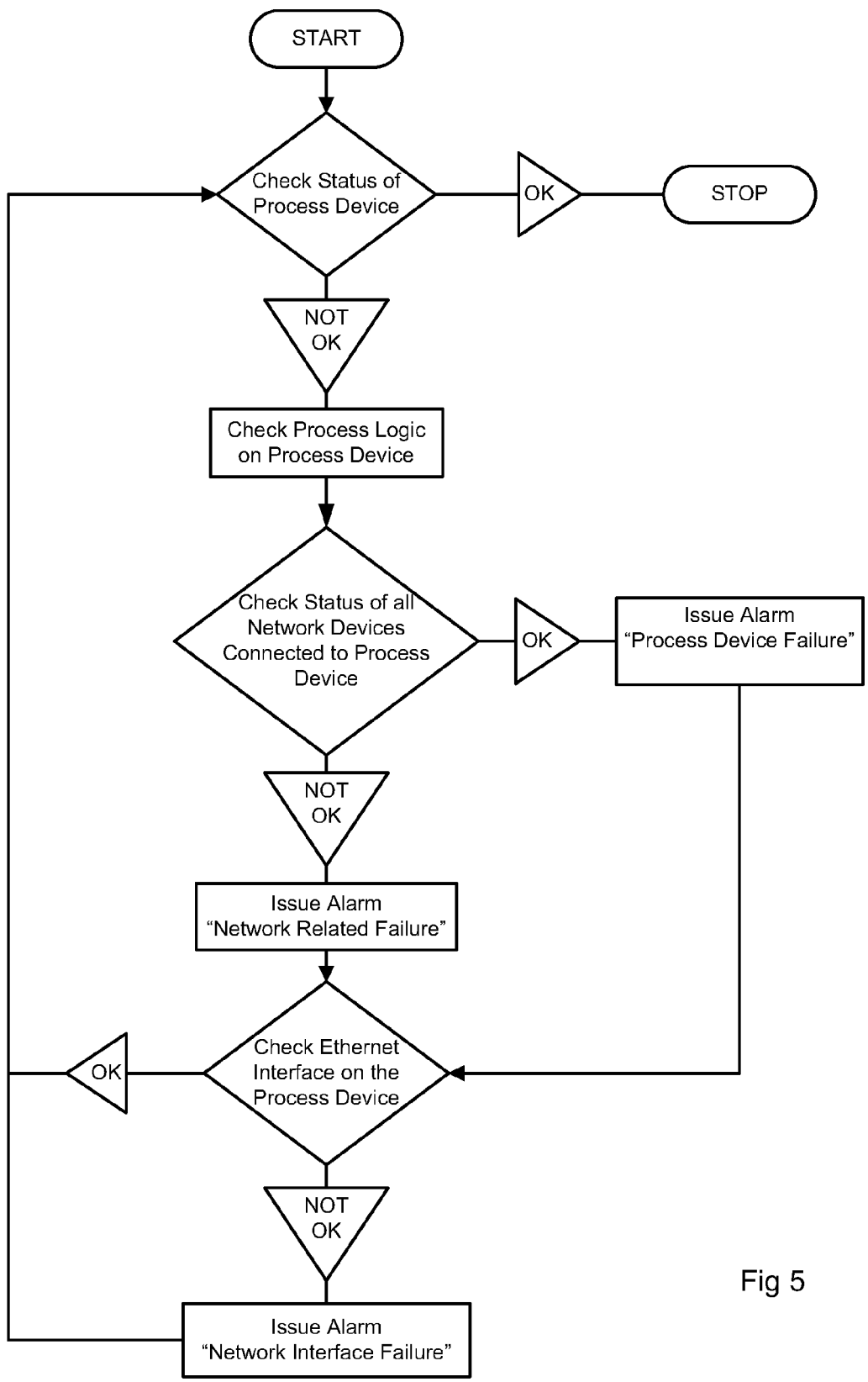
FIG. 5 shows a flowchart of an algorithm for comparison and combination of data for a process control application and from a network monitoring application.

FIG. 5 shows a flowchart of a combination algorithm, where the process values concerning the status of a process device are compared with the network values from the network devices to which the process device is connected to. If the process value from a process device shows a faulty status, then the process logic, installed on the process device, must be checked. This check must be followed by another one, which concerns all the network devices the respective process device is connected to. If all the network devices show a correct status, then the faulty status shown on the process device is most likely due to the installed process logic on the respective device and an alarm should be issued and the error repaired. If some of the network devices the process device is connected to show a faulty status, then the faulty status the process device was showing may be due to the faulty network devices and an alarm should be issued and the error repaired.

These steps of the algorithm may be followed a check of the Ethernet interface of the process device, in order to insure the faulty status is not related to this situation. In case this shows faulty, an alarm should be issued and the error repaired.

The algorithm is then run until there are no more faulty status' reported. The algorithm would be as follows:

```
Until (no more NOT OK status reported)
    If (process_device.process_value.status=NOT OK
        Check process logic on process device
        If (for all connected (network_device.network_value)=OK)
            Issue_alarm (process device failure)
        else (for some of connected
            (network_device.network_value)=NOT OK
            Issue_alarm (network related failure)
        Check process_device Ethernet interface on process device
        If (process_device.Ethernet_interface=NOT_OK)
            Issue_alarm (network interface failure)
```

Test Example

In the following example network and control information were gathered for a control device, which in this case was an ABB AC800M controller, installed in a test installation. Network information was also gathered for the connections of this controller to a network switch, which is a network device, that is, a device for regulating data communications over a network.

The control device repeatedly reported Bad network status at two-hourly intervals and at each time every two hours the network device reported high bandwidth usage for the port to which the said control device was connected.

Figure 6:
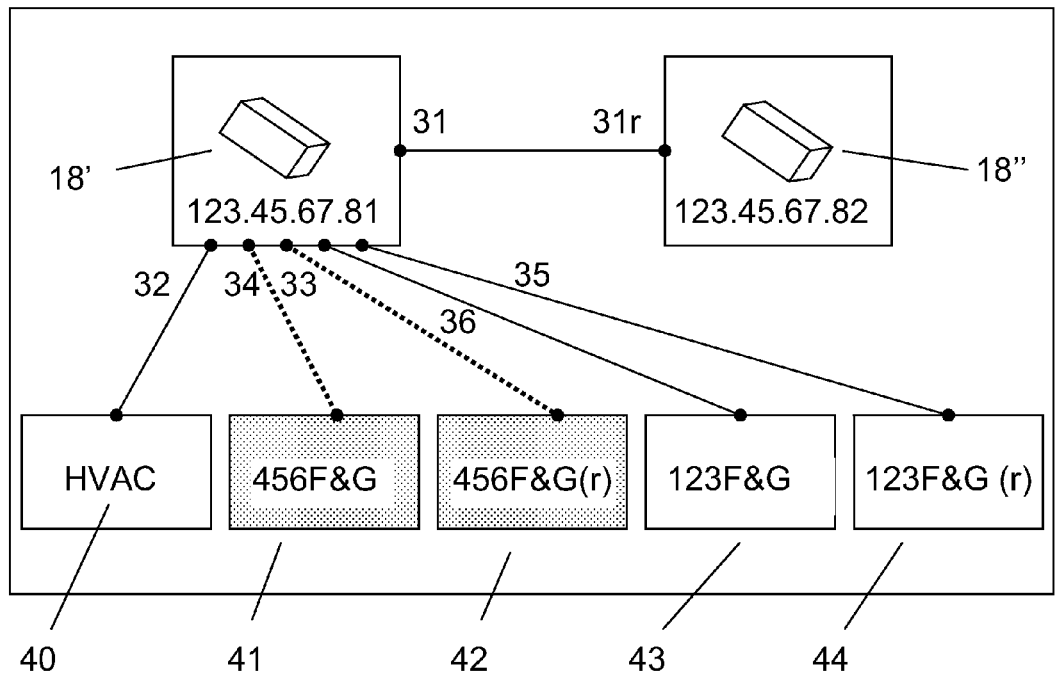
FIG. 6 shows a simplified HMI (Human Machine Interface) for an application for process control or supervision of process control devices in an industrial control system.

During this time the control information concerning the control device displayed a good status. This particular control device is redundant and therefore it needs two connections to the network device, see FIG. 6. FIG. 6 shows a simplified graphic user interface of a SNMP network management application monitoring a network and running, for example, on a supervision station for an industrial plant. Such an interface may have been constructed using a SNMP network management application mentioned above. The figure shows a first network device 18' at a first URL address and a second and redundant network device 18" with a second URL address. The first network device is connected to six ports indicated as 31, 32, 34, 33, 36 and 35. Ports 34, 33, are displayed with a different appearance from ports 31, 32, 35, 36 signifying a non-normal state. These ports are connected to a redundant controller shown as 456F&G 41 and 456F&G (r) 42.

Three process devices, shown here as HVAC, 123F&G and 123F&G(r) on the normal ports 31, 32, 35, 36 are each showing normal Status at 40, 43, 44 respectively for the process devices. However one first process control device 456F&G is showing a Bad Network status 41, indicated as a dotted background to the respective image or symbol object of the process control information application. The second and redundant network device 18" for the same control function is also showing a Bad Network Status 42 on a second device image object display.

Figure 7:
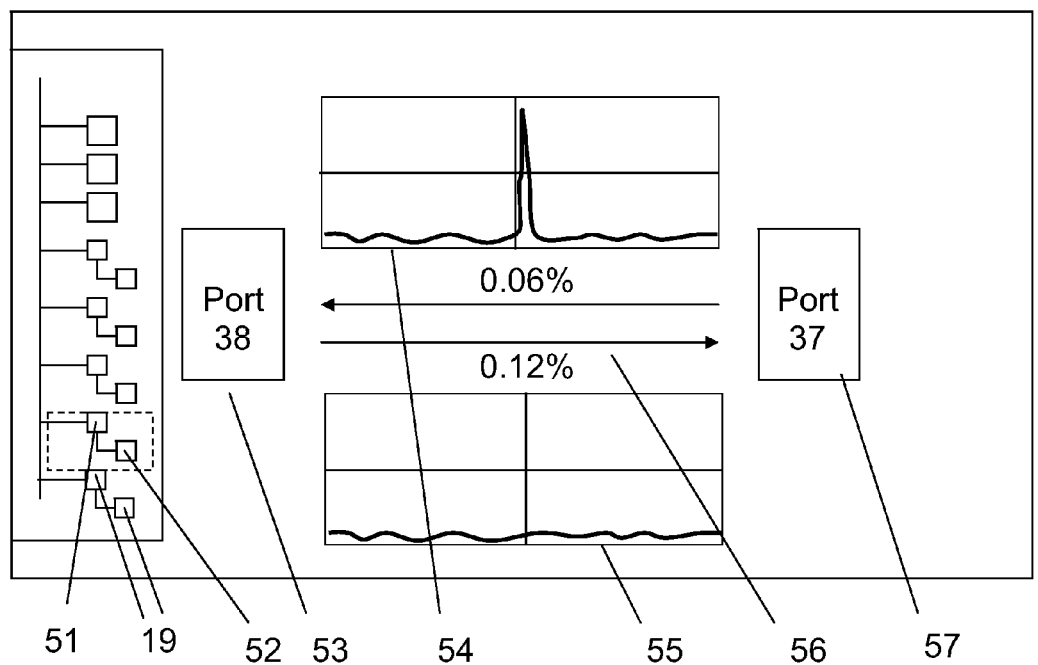
FIG. 7 shows a simplified HMI (Human Machine Interface) for an application for monitoring states of a data communications network in an industrial control system.

FIG. 7 shows a simplified graphic user interface of a network management application monitoring the data communication network. FIG. 7 shows the bidirectional bandwidth usage for two ports 53, 57, ie port 38 and port 37. The figure shows a plurality of interconnected process and network devices 19. The GUI shows the bidirectional bandwidth usage among a process device 52 and a network device 51. Data is displayed for the two devices on the GUI. The GUI displays for example data concerning bandwidth usage for the ports 37 and 38 associated with the two selected objects. The data includes bandwidth diagrams 54 and 55. It can be seen that the first bandwidth usage 54 (direction from port 37 to port 38) shows an excessive bandwidth usage periodically and that the second diagram 55 (direction from port 38 to port 37) shows a continuous and relatively low use of bandwidth on the network. These values are obtained using SNMP information, provided by the SNMP agents on the network device 51.

During the time the test investigation was taking place the controller 456 F&G and 456 F&G(R) 41 and 42 of FIG. 6 was restarted. After finishing the boot sequence, the redundant part (456 F&G (R)) had a complete hardware failure. Thus the excessive bandwidth usage by one of the two redundant control devices was detectable by means of the SNMP network monitoring of the network devices connected into the data network.

Thus by comparing in the test example above certain information from the process control system, Bad network status, with information from the SNMP network monitoring application for the same devices, in this case high bandwidth usage on one port, a fault signal is derivable from network data about one of the two redundant devices.

SNMP is a protocol for network monitoring and reporting that operates at the application level using TCP/IP transport protocols. It comprises agent software and management software in a client-server approach. The management software runs at least a monitoring function which uses data accessed by means of the agents running in each of the nodes of the network so configured. There are a plurality of public domain SNMP tools available as well as commercially distributed SNMP tools and packages from such well-known software companies as Cisco, Sun, Hewlett Packard and Microsoft. Network monitoring and reporting tools using a protocol which does not use transport level protocols, such as the TCP/UDP/IP suite, or which depend on protocols other than SNMP or in addition to SNMP, may also be used to practise the invention.

Preferably the industrial plant network is arranged with one or more data servers compatible with OLE for exchanging information, for reading, recording and/or transmitting information, and in particular for process information and plant related data. One or more data servers compatible with other standards such as COM/DCOM (Distributed Component Object Model) or DDE (Dynamic Data Exchange) or other industrial quality standards for information exchange or object linking across distributed systems may be used instead of, or as well as, an OLE server. There are other standards available for object linking and/or information exchange between mixed or un-homogenous systems, which include Common Object Request Broker Architecture (CORBA) and OpenDoc, sponsored through Component Integration Laboratories (CI Labs). Other protocols may be utilized in future, such as Java RMI (Remote Method Invocation).

Methods of the invention may be supervised, controlled or carried out by one or more computer programs. One or more microprocessors (or processors or computers) comprise a central processing unit CPU connected to or comprised robot control unit described, which processors, PLCs or computers perform the steps of the methods according to one or more aspects of the invention, as described for example for operating or controlling processes and equipment in an industrial control system and with reference to the algorithm as described and shown in FIG. 5. It is to be understood that the computer programs for carrying out methods according to the invention may also be run on one or more general purpose industrial microprocessors or PLCs or computers instead of one or more specially adapted computers or processors.

The computer program comprises computer program code elements or software code portions that make the computer or processor perform the methods using equations, algorithms, data, stored values, calculations, synchronisations and the like for the methods previously described, and for example in relation to the algorithm of FIG. 5. A part of the program may be stored in a processor as above, but also in a ROM, RAM, PROM, EPROM or EEPROM chip or similar memory means. The or some of the programs in part or in whole may also be stored locally (or centrally) on, or in, a memory storage device of a control system, as well as on other suitable computer readable medium such as a magnetic disk, CD-ROM or DVD disk, hard disk, magneto-optical memory storage means, in volatile memory, in flash memory, as firmware, or stored on a data server. Other known and suitable media, including removable memory media such as a memory stick and other removable flash memories, hard drives etc. may also be used. The program may also in part be supplied or updated from a data network, including a public network such as the Internet.

It should be noted that while the above describes exemplifying embodiments of the invention, there are several variations and modifications which may be made to the disclosed solution without departing from the scope of the present invention as defined in the appended claims.

The invention claimed is:

1. A method to supervise an industrial control system, comprising a plant network for supervision, a client/server network for server connection with workstations, a control network connected to industrial controllers, said method comprising the steps of gathering process information, and gathering network information, characterized by the further actions of comparing information provided by data communications network monitoring with process control information and using the result of the comparison to assist in determining a cause of a problem or possible problem in a process controlled by the said industrial control system;

further characterized by
recording at least one of an information, an event, and an alarm in said industrial control system when the said process information indicates problems, but the said network monitoring information does not indicate problems;
checking, on receipt of a faulty status for a process device, that process logic installed on the process device is as expected,
checking, on receiving confirmation that the process logic is as expected, all network devices connected to the process device,
generating an alarm for the process logic of the process device or the process device if all the network devices show a normal status; and
generating an alarm if some of the network devices show a faulty status for the faulty network devices.

2. The method according to claim 1, characterized in that the information is gathered in real-time.

3. The method according to claim 2, characterized in that the process control information is gathered from an industrial controller.

4. The method according to claim 1, characterized in that the process control information is recorded, transmitted or recorded and transmitted using a data server compatible with a standard for object linking or information exchange between distributed or un-homogenous systems.

5. The method according to claim 1, characterized in that the process control information is gathered using a data server compatible with OPC (OLE for Process Control).

6. The method according to claim 1, characterized in that the data communications network monitoring information is gathered using a device or application compatible with SNMP (Simple Network Management Protocol).

7. The method according to claim 1, characterized by gathering SNMP network information from any of the group of: an industrial controller supervision station, a SNMP (Simple Network Management Protocol) enabled switch or industrial router, and a network isolation device.

8. The method according to claim 1, characterized by comparing the combined information gathered according to SNMP (Simple Network Management Protocol) and OPC (OLE for Process Control) in order to assist in determining the cause of the problem or the possible problem.

9. The method according to claim 1, characterized by comparing the combined information gathered according to SNMP (Simple Network Management Protocol) and OPC (OLE for Process Control) using an algorithm arranged for taking into account the object type representations for process devices and for network devices.

10. The method according to claim 1, characterized by identifying one or more persons responsible for the controlled process and sending information based on a copy of the recorded information to one or more of the identified responsible persons.

11. The method according to claim 1, characterized by determining that: said process information indicates problems, an information or event or alarm is recorded, and one or more responsible persons are informed that said process device must be checked, and when: said network information does not indicate problems, and one or more responsible persons are informed that a failing process device is failed, and said network information indicates a failing active or passive network component, by the step of informing one or more responsible persons that the cause may be network related and not due to a failing process equipment.

12. The method according to claim 1, characterized by, on receipt of a selection of process and network devices, then obtaining network monitoring information history and process control information history and comparing information provided by data communications network monitoring with process control information and using the result of the comparison to assist in determining a cause of a problem or possible problem in a process controlled of said industrial control system.

13. A non-transitory computer readable medium comprising a computer program for supervising an industrial control system, comprising a plant network for supervision, a client/server network for server connection with workstations, a control network connected to industrial controllers, comprising at least one of computer code and computer software which, when fed into a computer, will make the computer carry out the method according to claim 1.

14. A non-transitory computer readable medium comprising a computer program which when read into a computer or processor will cause the computer or processor to carry out a method according to the steps of claim 1.

15. An industrial control system comprising a plant network for supervision, a client/server network for server connection with workstations, a control network connected to industrial controllers, said system comprising gathering process information, and gathering network information, characterized by a network isolation device for segregating the networks and by one or more applications for comparing information provided by data communications network monitoring with process control information and using the result of the comparison to assist in determining a cause of a problem or possible problem in a process controlled of said industrial control system;
further characterized by
recording at least one of an information, an event, and an alarm in said industrial control system when the said process information indicates problems, but the said network monitoring information does not indicate problems;
checking, on receipt of a faulty status for a process device, that process logic installed on the process device is as expected,
checking, on receiving confirmation that the process logic is as expected, all network devices connected to the process device,
generating an alarm for the process logic of the process device or the process device if all the network devices show a normal status; and
generating an alarm if some of the network devices show a faulty status for the faulty network devices.

16. The system according to claim 15, characterized by a data server compatible with one or more standards for object linking or information exchange between distributed or un-homogenous systems.

17. The system according to claim 15, characterized by a data server compatible with OPC (OLE for Process Control).

18. The system according to claim 15, characterized by gathering data communications network monitoring information using a device, application or agent compatible with SNMP (Simple Network Management Protocol).

19. The system according to claim 14, characterized by gathering data communications network monitoring information using any of the group comprising: an industrial controller supervision station, a SNMP (Simple Network Management Protocol) enabled switch or industrial router, and a network isolation device.

20. The system according to claim 15, characterized by comparing the combined information gathered according to SNMP (Simple Network Management Protocol) and OPC (OLE for Process Control).

21. The system according to claim 15, characterized by comparing the combined information gathered according to SNMP (Simple Network Management Protocol) and OPC (OLE for Process Control) using an algorithm arranged for taking into account the object type representations for process devices and for network devices.

22. The system according to claim 15, characterized by a memory storage device comprising a computer program for comparing the combined information gathered according to SNMP (Simple Network Management Protocol) and OPC (OLE for Process Control).

23. The system according to claim 15, characterized by a graphic user interface for displaying information dependent on comparing the combined information gathered according to SNMP (Simple Network Management Protocol) and OPC (OLE for Process Control).

24. The system according to claim 15, characterized by a graphic user interface for displaying information dependent on comparing the combined information gathered according to SNMP (Simple Network Management Protocol) and process information provided by a data server means compatible with one or more standards for object linking or information exchange between distributed, mixed or un-homogenous systems.

25. The system according to claim 15, characterized by means for communicating information to a responsible operator or other user information about an alarm for a process device or a network device.

* * * * *